United States Patent
Oreans et al.

(10) Patent No.: US 6,296,416 B1
(45) Date of Patent: Oct. 2, 2001

(54) VIBRATION DAMPER, IN PARTICULAR FOR VEHICLE STEERING WHEELS

(75) Inventors: Derk Oreans, Stockstadt; Reinhold Kehle, Blankenbach; Günter Nawratil, Pörnbach, all of (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/389,146

(22) Filed: Sep. 2, 1999

(30) Foreign Application Priority Data

Sep. 4, 1998 (DE) .......................................... 298 15 926 U

(51) Int. Cl.$^7$ ....................................................... F16D 3/00
(52) U.S. Cl. ............................. 403/220; 74/552; 403/225
(58) Field of Search ..................... 403/220, 224, 403/225, 203, 372, 291, 24; 74/558, 552; 280/777

(56) References Cited

U.S. PATENT DOCUMENTS

| 2,079,798 | * | 5/1937 | Geyer ................................. 403/225 X |
| 4,580,666 | * | 4/1986 | Ferguson .......................... 402/224 X |
| 4,712,446 | * | 12/1987 | Kamata et al. ....................... 474/492 |
| 5,158,269 | * | 10/1992 | Hein et al. ........................ 403/225 X |
| 5,785,450 | * | 7/1998 | Ichikawa et al. ................ 403/225 X |

FOREIGN PATENT DOCUMENTS

4344615    6/1994   (DE) .

* cited by examiner

Primary Examiner—Harry C. Kim
(74) Attorney, Agent, or Firm—Tarolli, Sundheim, Covell, Tummino & Szabo L.L.P.

(57) ABSTRACT

A device for eliminating vibrations in motor vehicles, more particularly vibrations occurring in the steering wheel rim, includes a fastening plate and a vibratory body which is elastically connected to the fastening plate. An element is provided for limiting the amplitudes of vibration of the vibratory body, this element being coated with a vibration-damping material and being able to abut at a counter element. The counter element is provided with a rough surface in a region of contact with the element.

9 Claims, 2 Drawing Sheets

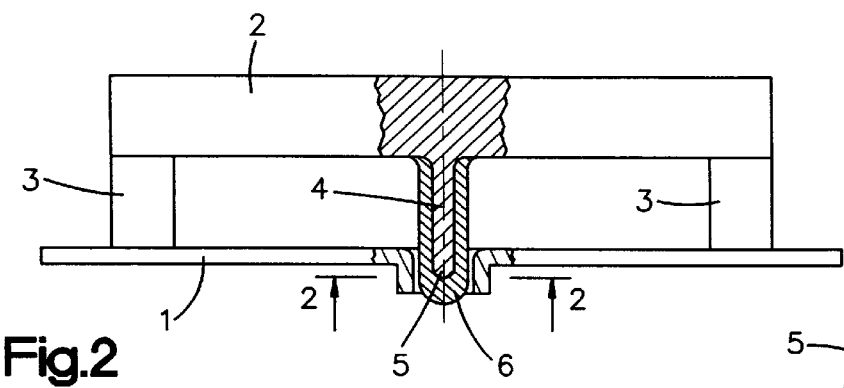
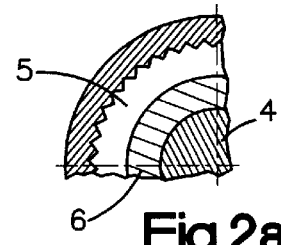
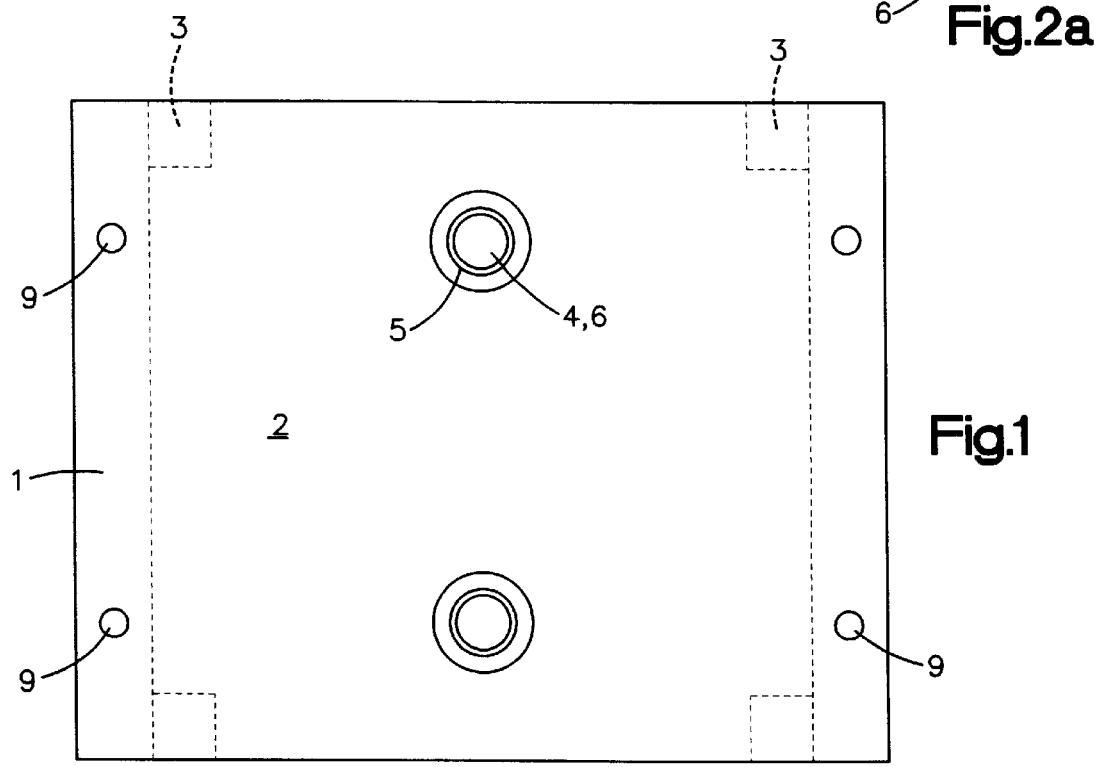
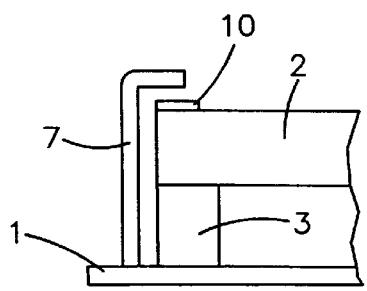
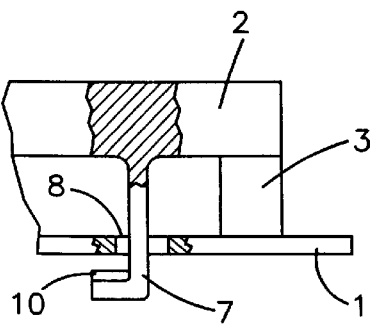

VIBRATION DAMPER, IN PARTICULAR FOR VEHICLE STEERING WHEELS

The invention relates to a device for eliminating vibrations in motor vehicles, more particularly vibrations occurring in the steering wheel rim.

BACKGROUND OF THE INVENTION

Vehicular vibrations may be caused by the drive train, by wheels being inadequately balanced, by road surface irregularities or by changes in streamlining conditions. They may greatly differ in frequency and amplitude and are basically inevitable. In modem passenger cars, however, systems for damping vibrations have since become so sophisticated that any appreciable nuisance in this respect hardly occurs. In a device using a vibratory body which is adapted as regards mass of the vibratory body and spring rate of the elastic suspension for specific vibrations affecting the steering wheel rim, it was found out that although the nuisance vibrations may be effectively suppressed by pins coated with a dampening material and abutting a fastening plate for limiting the vibration amplitude, the pins resulted in a noise nuisance of the fastening plate under critical conditions even though the vibration-damping material employed also has noise-damping properties. Keener investigations disclosed, however, that under critical conditions the vibratory body attained its maximum possible amplitude so that the pins coated with the vibration-damping material knock against the fastening plate at the frequency of the vibration introduced, resulting in a noise nuisance.

The invention is based on the object of avoiding such nuisances in conjunction with vibration damping.

BRIEF DESCRIPTION OF THE INVENTION

This object is achieved by means of a device for eliminating vibrations in motor vehicles, more particularly vibrations occurring in the steering wheel rim, which includes a fastening plate and a vibratory body which is elastically connected to the fastening plate. An element is provided for limiting the amplitudes of vibration of the vibratory body, this element being coated with a vibration-damping material and being able to abut at a counter element. The counter element is provided with a rough surface in a region of contact with the element. The invention is based on having discovered that the vibration-damping material at the frequencies involved in this case tends to come into contact with the companion surface area so snugly, due to the elastic deformation, that the air in the region of contact tends to be completely driven out, resulting in a plopping noise from a certain vacuum sticking effect in counter movement when the vibration-damping material is relifted from the contact area in the counter movement. Accordingly, this noise can be avoided by preventing the vacuum sticking effect from occurring. This is why the counter element is provided with a rough surface. The term "rough" in this context designates a surface which in addition to the unavoidable surface roughness is provided with larger irregularities which are visible with the naked eye and are provided by purpose. A surface formed in this way prevents a sucking contact of the vibration-damping material with the counter element so that on lift-off a vacuum sticking effect producing the nuisance noise now no longer occurs.

Advantageous aspects of the invention read from the sub-claims.

BRIEF DESCRIPTION OF THE DRAWINGS

The invention is now described with respect to various embodiments which are shown in the enclosed drawings. In the drawings, FIG. 1 is a schematic plan view of the device in accordance with the invention;

FIG. 2 is a side view of the device as shown in FIG. 1;

FIG. 2a is an enlarged, partial sectioned view of plane II—II of FIG. 2;

FIG. 3 is an illustration of a first embodiment of a catch hook;

FIG. 4 is an illustration of a second embodiment of a catch hook;

DETAILED DESCRIPTION OF THE INVENTION

Figure 5:
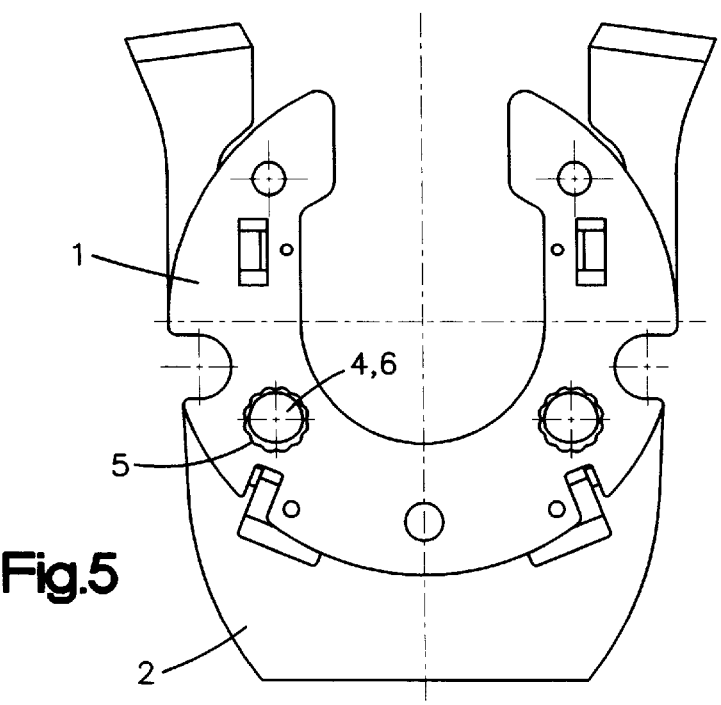
FIG. 5 is a plan view of an embodiment of the device in accordance with the invention for suppressing steering wheel rim vibrations.

Referring now to FIG. 1 there is illustrated schematically the fastening plate identified 1 and the vibratory body located therebelow identified 2. Both parts are elastically connected to each other via four webs 3, the material involved being rubber or some other elastic material vulcanized to the two components 1, 2. Such devices, often termed "rubber bonded metal" already have a proven record of success in the elastic engine mounting on vehicle frames.

The vibratory body is provided with an element for limiting the amplitudes of vibration of the vibratory body relatively to the fastening plate. This limiting element is here formed as a pin 4 which is coated with a vibration-dampening material 6. Pin 4 co-operates with a counter element which is here formed as the edge of a recess 5. Recess 5 is formed in fastening plate 1 by stamping and beading. In this embodiment, two pins are provided which engage into two recesses.

The vibratory body 2 which is capable of vibrating relative to the fastening plate 1, preferably parallel thereto, for suppressing unwanted vibrations is restricted in its vibration amplitude to a predetermined limit dictated by the space between the recess 5 and the vibration-damping coating 6 of the pin 4. This space may be adapted in design to the individual circumstances taking into account the possible elastic deformation of the vibration-damping coating 6. The fastening plate 1 comprises holes 9 through which the device may be joined to the vehicular component at which the nuisance vibrations occur.

Referring now to FIG. 2 it is evident from the side view or section illustration how the pin 4 of the vibratory body 2 comprising a vibration-damping coating 6 engages the recess 5 in the fastening plate 1. It will readily be appreciated that the vibration movement of the vibratory body 2 permitted by the elastic connection via the webs 3 parallel to the fastening plate 1 may thereby be limited in its amplitude. The configuration in accordance with the invention of the rough contact region of the recesses 5 for the coated pins 4 consists of a coarse roughening formed by a corrugation, as can be seen in FIG. 2a.

The elastic fastening between the fastening plate 1 and the vibratory body 2 via the webs 3 also permits, in addition to the desired vibration parallel to the fastening plate 1, a vibration perpendicular to the fastening plate 1 which as shown in FIGS. 3 and 4 may be limited by means of one or more catch hooks 7. In addition, these catch hooks 7 prevent the vibratory body 2 from becoming totally released from the fastening plate 1 in case a web 3 breaks or the vulcanizing bond fails. In the embodiment as shown in FIG. 4 the catch hook 7 is guided through a recess 8 in the fastening plate 1. Provided between the catch hook 7 and the opposite component 1, 2 is a coating 10 of a vibration-damping material as it also surrounds the pin 4. Here too, the opposite surface area cooperating with the vibration-damping material 10 is in accordance with the invention not smooth, but roughened or configured alternately with surface area sections protruding more or less far in the radial direction so as to prevent unwanted noise being produced in this respect, too.

Figure 6:
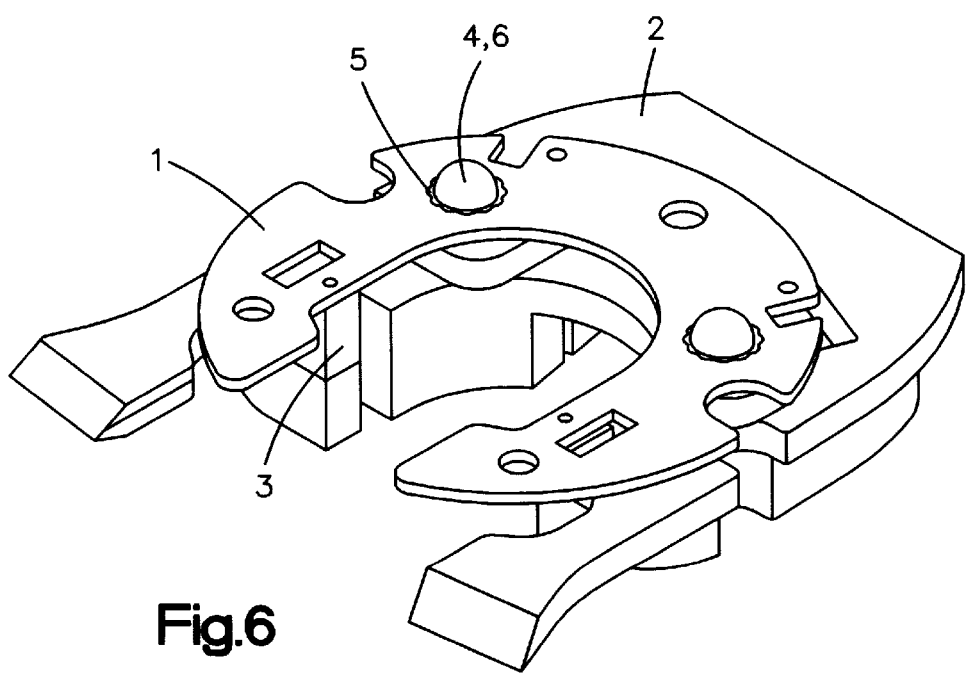
FIG. 6 is a view in perspective of the embodiment as shown in FIG. 5.

Referring now to FIGS. 5 and 6 there is illustrated an embodiment of a device including fastening plate 1 and vibratory body 2 designed for suppressing vibrations at the rim of a steering wheel. This device is arranged concentrically to the axis of the steering wheel and is connected to the carcass of the steering wheel via the fastening plate 1. The vibratory body 2 is in turn connected to the fastening plate 1 via four webs 2 of an elastic material, the vibratory body intended to vibrate mainly in a plane perpendicular to the axis of the steering wheel. Vibrations in the direction of the steering wheel axis can, however, not be excluded and may be limited via catch hooks as shown in FIGS. 3 or 4.

Figure 7:
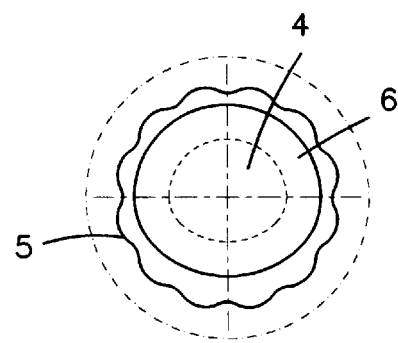
FIG. 7 is a detail of FIG. 5 shown on a magnified scale.

The vibratory body is in turn equipped with pins 4 provided with a coating 6 of a vibration-damping material. The recess 5 in the fastening plate 1 is configured star-shaped with web-like protuberances or groove-like recesses running full-length in the axial direction of the pins 4. It is in this way that the companion surface area between the recess 5 and the coating 6 of the pins 4 is designed in accordance with the invention so that the vacuum sticking effect as described above cannot occur. Details are evident from the magnified illustration as shown in FIG. 7.

Devices in accordance with the invention intended for use on steering wheels result in a specific installation position in which the vibratory body 2 is already displaced in the resting position relative to the fastening plate 2 due to the force of gravity. This displacement depending on the installation position and the elastic deformation of the webs 3 is compensated in design by the axis of the coated pins 4 not coinciding with the axis of the recess 5 in a flat arrangement of the device not influenced by the force of gravity, whereas when influenced by the force of gravity both axes are required to coincide in the installation position on the steering wheel.

Tests carried out on the device in accordance with the invention indicated further that in critical angular positions of the steering wheel, i.e. when cornering on an uneven road surface a peripheral consistently thick coating 6 of the pins with vibration-damping material is not sufficient. Satisfactory operation of the device in accordance with the invention could not be achieved until the coating 6 of the pins 4 symmetrical to a vertical centerplane is configured such that the radial thickness varies from a minimum value at the top center continuously to a maximum value below the horizontal middle and then assuming an average value at the bottom center. This cross-sectional shape of the coating 6 is evident from FIG. 7 to thus take into account differences in how the coating 6 is stressed in the critical angular positions of the steering wheel.

What is claimed is:

1. A device for eliminating vibrations in motor vehicles, said device including:

a fastening plate;

a vibratory body which is elastically connected to said fastening plate;

an element for limiting amplitudes of vibration of said vibratory body; and a counter element, said element being formed as a pin coated with a vibration-damping material and being able to abut at said counter element;

said counter element being provided with a rough surface in a region of contact with said element and being formed as an edge of a recess in said fastening plate into which said pin engages with radial play on all sides with respect to said edge of said recess;

said rough surface of said counter element being formed with surface area sections alternately protruding in a radial direction of said pin in different extensions, said vibratory body being elastically connected to said fastening plate via a plurality of webs.

2. The device of claim 1, wherein said contact region comprises over its circumference and in alternation axially continuous, web-like protuberances and groove-like recesses.

3. The device of claim 2, wherein said contact region features a star-shaped cross-section.

4. The device of claim 1, wherein said contact region is configured slightly conical.

5. The device of claim 1, wherein said pin is configured with a circular cross-section and wherein said vibratory body is elastically connected to said fastening plate such that an axis of said pin coincides with an axis of said recess when said device is located in a predetermined installation position.

6. The device of claim 5, wherein said pin has a top center, a horizontal middle portion and a bottom center, said coating of said pin being configured symmetrical to a vertical centerplane such that a radial thickness of said coating varies from a minimum value at said top center continuously to a maximum value below said horizontal middle portion and then assuming an average value at said bottom center.

7. The device of claim 1, wherein said fastening plate or said vibratory body comprises one or more catch hooks clasping said vibratory body or fastening plate so that the vibration amplitude perpendicular to said fastening plate is limited, preventing said vibratory body from lifting off from said fastening plate in case one of said webs breaks.

8. A device for eliminating vibrations in motor vehicles, said device including:

a fastening plate;

a vibratory body which is elastically connected to said fastening plate;

an element being provided for limiting amplitudes of vibration of said vibratory body; and a counter element, said element being coated with a vibration-damping material and being able to abut at said counter element;

said counter element being provided with a rough surface in a region of contact with said element;

said fastening plate or said vibratory body comprises one or more catch hooks clasping said vibratory body or fastening plate so that a vibration amplitude perpendicular to said fastening plate is limited, preventing said vibratory body from lifting off from said fastening plate in case one of said webs breaks, said one or more catch hooks or a region of said vibratory body or said fastening plate which can be contacted by said one or more catch hooks is coated with a vibration-damping material.

9. The device of claim 8, wherein said surface area opposite said vibration-damping material is configured with surface area regions having protrusions of different radial extensions.

* * * * *